June 22, 1971

H. FLEISSNER

3,585,729

PROCESS AND APPARATUS FOR THE TREATMENT
OF LENGTHS OF MATERIALS

Original Filed July 20, 1967

Schnitt A-A

*INVENTOR.*
HEINZ FLEISSNER

United States Patent Office 3,585,729
Patented June 22, 1971

3,585,729
PROCESS AND APPARATUS FOR THE TREATMENT OF LENGTHS OF MATERIALS
Heinz Fleissner, Egelsbach, near Frankfurt am Main, Germany, assignor to VEPA AG., Basel, Switzerland
Original application July 20, 1967, Ser. No. 654,728, now Patent No. 3,503,134. Divided and this application Apr. 29, 1969, Ser. No. 821,551
Int. Cl. F26b 3/06
U.S. Cl. 34—12
15 Claims

ABSTRACT OF THE DISCLOSURE

The present disclosure relates to a process and apparatus for the treatment of materials, for example drying, steaming, setting, curing, etc., lengths of textile materials such as woven and knitted fabrics, non-woven, tufteds, and the like, with a treatment medium, for example, air, steam or air/steam mixtures. More particularly, the present disclosure is directed to a process and apparatus for the treatment of materials which comprises conveying a continuous length of material through a treatment chamber on the surface of at least one sieve means subjected to a suction draft, said material being held to said sieve means by said suction draft, and drawing a treatment medium around and through the material being treated, said material being held and guided at the outlet of the apparatus in a stretched condition on tensioning elements after it is removed from the sieve means.

---

The present application is a divisional application of application Ser. No. 654,728, filed July 20, 1967, now Pat. No. 3,503,134.

BACKGROUND OF THE INVENTION

The present invention relates to a process and apparatus for the treatment of materials, for example, drying, steaming, setting, curing, etc., lengths of textile materials such as woven and knitted fabrics, non-wovens, tufteds, slivers, tow, loose stock, etc., with a treatment medium, for example, air, steam, or air/steam mixtures wherein the materials being treated are conveyed on at least one sieve means subjected to a suction draft and are held to the sieve means by the suction draft during the treatment process. The sieve means which can be used in the present invention include any air-permeable conveying element.

Apparatus containing sieve drums subjected to a suction draft are well known. In these devices the material to be treated is held to the sieve drums by the suction draft only and is conveyed through the treatment chamber by the rotation of the sieve drums. The sieve drums may be arranged in one horizontal row or in one vertical row or staggered to each other in two or more rows. In these devices the sieve drums are generally only partially covered with the material being treated. Baffles in the interior of the sieve drums interrupt the suction draft at that portion of the sieve drum which is not covered with the material being treated. In many cases, especially when handling delicate textile materials, the sieve drums can be covered with a fine wire mesh which is fastened to the sieve drums. Through the application of powerful suction drafts the material being treated is forced firmly against the sieve drum and/or the wire mesh cover. Shrinkage of the material in width is thus substantially eliminated. However, in many cases a shrinkage of the material, especially in the warp direction, is desirable. With sieve drum dryers this can be achieved by driving the inlet elements, for example a pair of rollers or a conveyor belt, at a higher speed than the first sieve drum, so that the material is overfed to the first sieve drum. In this way, it is possible to guide the material on the sieve drums without any tension in the warp direction and thus to allow for a full shrinkage of the material.

The surprising advantages of these sieve drum devices include the safe, tensionless, crease-free material guidance achieved even at maximum working speeds due to the fact that the material being treated rests on and is drawn to the sieve drums, and the extremely short treatment times as well as a substantially uniform treatment because the gaseous treatment medium is drawn through the material and thus flows around the fibers in the material.

In spite of these surprising advantages many commission finishers still use the tenter frame for the treatment of lengths of textile materials because with these tenter frames it is possible to maintain a certain, predetermined final width of the material. Thus it is also possible to stretch the material in width so that the final width is larger than the initial width. On the tenter frames the material is held at the edges by means of heavy pins or clip chains. As a result the material sags freely so that in the case of wet material, the material weight produces tensile stresses in addition to the shrinkage forces. However, tenter frames incorporate the disadvantage that they only work with material jetting. Thus only the two surfaces of the textile length are ventilated. For example in the case of high-grade finishing of textile materials impregnated with a synthetic resin, the synthetic resin tends to migrate to the surfaces during drying and is deposited there resulting in a board-like material finish. Also, an unevenness between the material edges and the remainder of the textile length is frequently observed which is attributed to different temperatures near the pin or clip chains. Due to the substantial temperature differences between the treatment chamber and the outer atmosphere, the chains are subjected to a heavy wear. Furthermore, heavy soiling of the chain lengths can be often observed if the tenter frame is used for dyeing processes and for finishing with synthetic resins. Apart from the high purchase costs, the susceptibility to disturbances and the high maintenance costs are additional disadvantages of the tenter frame. Treatment devices with sieve drums subjected to a suction draft are not only substantially less expensive but also, due to their solid design, are not susceptible to trouble and thus are substantially maintenance free.

SUMMARY OF THE INVENTION

An object of the present invention is to avoid the prior art disadvantages in the treatment of materials, for example textile materials.

Another object of the present invention is to provide an improved process and apparatus for the treatment of textile materials which is very economical and substantially maintenance free.

A further object of the present invention is to provide an improved process and apparatus for the treatment of textile materials wherein a predetermined final width of the material being treated is insured.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, it has been found that the above-mentioned disadvantages may be eliminated and a much improved process and apparatus for the treatment of materials, for example textile materials, can be provided wherein the material being treated is guided and held at the inlet of the apparatus and/or at the outlet of the apparatus between tensioning elements, for example tenter chains, whereby the material is held in a stretched condition between said tenter chains until it is either fed and/or passed onto a sieve subjected to a suction draft and/or removed from the last sieve means and transferred to tenter chains maintained at substantially the treatment temperature. The zone containing the tensioning elements, for example tenter chains, is called the tenter zone. Using this process it is insured that the material does not change, for example shrink, while it is passed from the tenter chains to the sieve means and/or from the sieve means to the tenter chains so that the effect of the combined tenter chains/sieve means is fully maintained. A particularly effective sieve means are sieve drums subjected to a suction draft.

If the tensioning elements are arranged in front of the sieve means, for example in front of the sieve drums, it is desirable to stretch the material beyond the desired final width, preferably by an amount which is equal to or slightly greater than the width shrinkage of the material during the treatment on the sieve drums. A slight width alteration is possible by adjusting the tensile strength of the batching device disposed behind the last sieve means. However, this is only possible if the material leaves the treatment apparatus with a slightly greater width than prescribed.

In order to obtain a voluminous handle, especially with knit goods and to simultaneously effect fiber setting, it is advantageous to jet the material being treated with steam between the two chains and/or on the adjoining conveying element, for example a sieve drum, to treat the material with hot air, superheated steam or a steam-air mixture on at least one additional sieve drum in order to dry and/or set the material, and to cool it down and/or to condition it subsequently on a sieve drum. By utilizing the suction draft of the sieve drums the steam is intensively and uniformly drawn through the material and thus flows around the fibers in said material.

It is also advantageous, especially when handling a material which is to fully shrink, to pass said material in a spread condition on a conveying element, preferably a conveyor belt, and to jet it with steam, if possible from both sides, on the conveyor belt. Subsequently the material can be dried and/or set on at least one sieve drum subjected to a suction draft and then held, cooled down and/or conditioned between tenter chains. This process is particularly effective for treating materials which consist of blends of synthetic fibers and cellulose fibers since with these materials the dye stuffs for the cellulose fibers are generally fixed with steam whereas the dye stuffs for the synthetic fibers are generally fixed by means of hot air. In these cases fiber setting is effected simultaneously.

Accordingly to another embodiment of the present invention it is frequently desirable to humidify the fibers before the steaming treatment, for example by spraying liquid onto the fibers and to steam, dry and/or set them subsequently with hot air, superheated steam, or an air/steam mixture. The liquid may be a treatment medium, that is a dyeing liquor, a bleaching liquor, a synthetic resin dispersion, a finishing agent and the like.

The apparatus for carrying out the process according to the present invention comprises a tenter zone with pin chains combined with a preferably heat-insulated housing, wherein at least one sieve means subjected to a suction draft, preferably a sieve drum, serves as a conveying element, one or several fans are provided for the production of a suction draft and for circulating a treatment medium and a heating means is arranged in the circulation zone of said treatment medium. The tenter zone is at least partially arranged outside of the housing as an inlet and feeding means and/or as a discharge means. When the tenter zone is at the inlet of the apparatus it is often advantageous to screen the tensioning means from the treatment medium being circulated in the housing. For various purposes, especially if the tenter zone is arranged at the discharge end of the apparatus, it is advantageous to at least partially surround it with a housing and to subject the material in the housing to a partial treatment, for example to expose it to heat.

If the tensioning elements are arranged at the inlet of the apparatus it is especially desirable to design the tensioning elements as pin chains and to deflect them vertically or substantially vertically, that is to provide them with a vertical chained guidance and to effect the pinning-up and the passage of the material to the treatment chamber within the deflection range of the pin chains. Only if the pinning-up is effected within the deflection range is it possible to remove the material from the pins within the deflection range, since within the deflection range the individual pins have a larger distance from each other than within the horizontal range.

However, on the usual tenter frames the pinning up is not effected in the deflection range but rather in the horizontal range. In order to render it possible to design the pinning up device and the whole inlet without any modification to the tenter frame, a roller which preferably is designed as a sieve roller and subjected to a suction draft is provided for taking the material being treated out of the pins and passing it on to the subsequent sieve element. The roller has the purpose of guiding and holding the material from the time it is taken out of the pins until it is passed on to the sieve element in the treatment chamber. It is expedient to take the material out of the tenter chains and to pass it on to the subsequent sieve element at the narrowest point between the tenter chains and the sieve element whereby the material being treated is removed from the pins by the suction draft of the sieve element and/or by stationary or rotating means.

The sieve means of the treatment apparatus and the tenter feed zone means have a common, infinitely variable drive and an infinitely variable gear between the drive and the tenter feed zone means or between the drive and the treatment apparatus in order to render it possible to pass the material being treated on to the subsequent sieve elements with any desired overfeed so that the material is free to shrink on the sieve elements to the extent of the overfeed during the treatment. If a roller for the material passage is provided between the tenter zone means and the treatment apparatus, the roller is connected with the drive of the tenter feed zone means and/or driven by said tenter feed zone means. In this case the overfeed is effected between the roller and the adjacent sieve element in the treatment chamber.

It is also possible to effect material passage from the tenter chains to the sieve drum means without interconnecting an element for removing the material from the pins. In this case care is taken so that the material is removed from the pins before the tenter chains are deflected and/or in the plane in which the material is guided on the tenter chains which is substantially tangential to the adjoining sieve drum means. With this arrangement it is possible to remove the material from the tenter chains by the suction draft of the sieve drum so that the material cannot shrink. At the point of material passage the distance between the pin tips and the sieve drum jacket may be only a few millimeters, for example about one to two millimeters.

According to another feature of the present invention it is desirable to arrange the pin tips of the tensioning elements in the neutral zone of the tenter chains or underneath that neutral zone. In this manner it is possible to pin up the material within the plane range of the tenter chains and to remove it from the pins within the deflection range. With this kind of guidance of the tensioning elements the material is not elongated and the pins are not forced apart within the deflection range thus permitting the material to be removed from the pins properly.

If a tenter zone means is installed behind the treatment chamber containing at least one sieve drum subjected to a suction draft, care is to be made that the material is taken by the tenter zone means and/or by the tensioning element at substantially the same temperature as the treatment temperature. This can be achieved by heating the chamber which partially surrounds the tenter zone preferably my means of the air of the treatment chamber. However, instead of hot air or in addition to hot air it is also possible to use infrared heaters for heating the tenter zone. The arrangement of the tenter zone behind the treatment chamber is especially desirable when setting lengths of material consisting of synthetic fibers or materials which contain synthetic fibers. In order to set the material in the tenter zone and to "freeze" it with a certain final width, it is desirable to correlate to the tenter zone a blower and/or jet boxes for cooling and conditioning the material.

Especially for the treatment of knit goods, it is suggested to correlate a steaming means to the roller means which is located at the inlet of the apparatus outside of the treatment chamber and is utilized for removing the material from the tenter chains and passing it on to the subsequent sieve drum means and/or the tenter zone.

For the steaming treatment a steam-permeable conveying element, for example, a sieve belt with a steaming means, for example with steam nozzle tubes, may be correlated to the apparatus outside the treatment chamber as an inlet means. At the outlet of the treatment chamber a tenter zone may be arranged with a cooling means. With knit goods it is desirable to guide the material without any lengthwise tension before and during the entire treatment. According to the present invention this is possible if the material roll and/or the material package is disposed on the inlet element, whereby said material roll is guided in lateral, stationary parts, with guide slots which are open at the top. These stationary parts can be effectively arranged at the inlet conveying element.

For treatments which require extended treatment times, an apparatus with at least one sieve drum at the inlet and a subsequent dwell zone, preferably in the form of two or more rows of rollers over which the textile material is alternately guided can be readily provided together with a tenter zone at the discharge end of the apparatus. According to the present invention instead of a sieve drum, a sieve belt subjected to a suction draft can also be used. Furthermore a sieve belt can be used as a dwell zone wherein the material is piled up in folds.

BRIEF DESCRIPTION OF THE DRAWINGS

The present invention will become fully understood from the detailed description hereinbelow and the accompanying drawings which are given by way of illustration only and thus are not limitative of the present invention and wherein.

DESCRIPTION OF THE PREFERRED EMBODIMENTS

Figure 1:
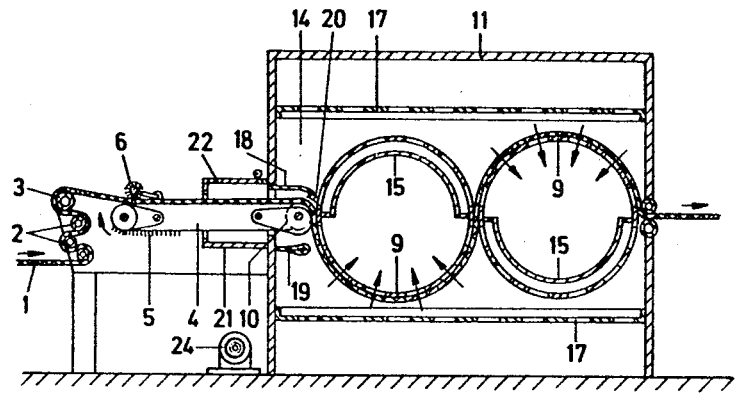
FIG. 1 is a longitudinal section of the apparatus of the present invention with a tenter zone at the inlet of the apparatus.

Referring now to the drawings wherein like reference numerals are used throughout the various views to designate like parts, the apparatus of the present invention comprises a system wherein the material 1 to be treated is passed on via rollers 2 which may also be designed as expander rolls and via deflector roll 3 to a tenter zone 4 containing two pin chains 5 which are adjustable in width. Brush rollers 6 serve for forcing the material 1 into the pins of the pin chains 5. The width adjustment of the pin chains 5 is effected by means of hand wheels 7 and threaded spindles 8 in the embodiment shown in FIG. 3. However, an automatic adjustment using a servo motor (not shown) may also be provided.

In the apparatus according to FIG. 1 the material passage to sieve drum 9 subjected to a suction draft is effected by the suction draft of the sieve drum and also by the additional cooperation of eccentrically arranged means 10. With this manner of removing the material from the pin chains, the chains must be guided in such a way that the pin tips are situated within the divided circle of the deflection. The treatment device proper has a heat-insulated housing 11 which is subdivided by means of a lengthwise partition means 12 into a fan chamber 13 and into a treatment chamber 14. In the treatment chamber sieve drums 9 subjected to a suction draft are arranged and in the fan chamber fan wheel means 16 are disposed. The suction draft is interrupted at the drum portion which is not covered with the material being treated by means of a baffle 15 which is arranged in every sieve drum 9. The air drawn out of the drums is returned at both sides, that is upwards and downwards into the treatment chamber 14. Before being returned to the treatment chamber the air can be passed around heating or cooling means 45 in the fan chamber. For equalizing the air, sieve sheets 17 are provided above and beneath the sieve drums 9.

In order to make sure that the pin chains 5 and the other elements of the tenter feed zone 4 remain substantially unaffected by the temperature in the treatment chamber 14 and by the treatment medium, screening means 18 and 19 extending over the whole width of the treatment chamber are provided above and beneath the tenter zone 4 extending into the treatment chamber. The screen may consist of heat-insulated parts, and at that portion of the drum which is not covered with the material being treated it may extend directly to the sieve drum 9 by means of a ceiling strip 20. Furthermore, in this embodiment the tenter zone is partially surrounded by an inlet housing 21 containing a ceiling 22 which can be tilted. A drive means 23 for the fans 16 is provided at the outside of the housing 11 whereas a drive means 24 for the tenter zone and the subsequent sieve drums is arranged underneath the tenter zone 4.

Figure 2:
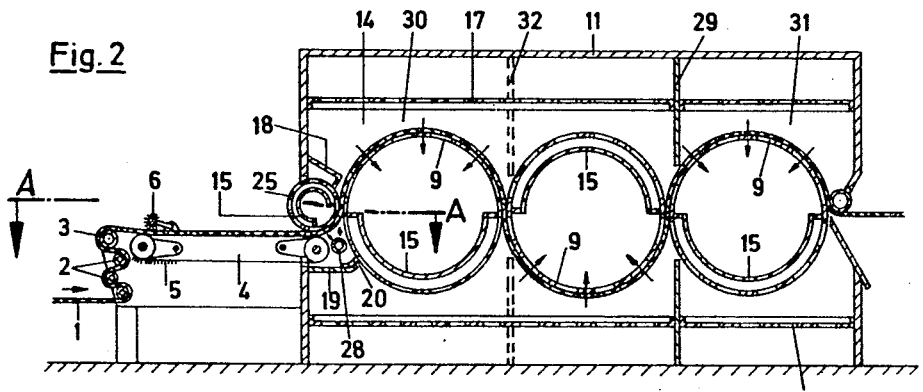
FIG. 2 is an apparatus similar to that shown in FIG. 1.
Figure 3:
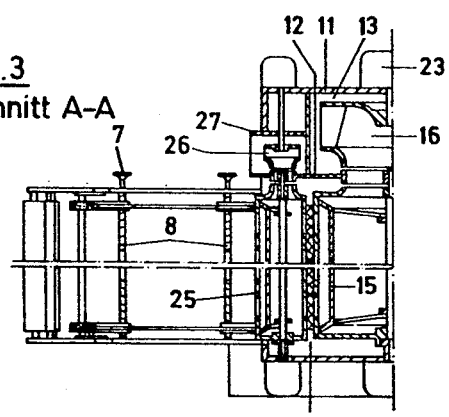
FIG. 3 is a sectional view of the inlet zone of the apparatus according to FIG. 2 taken along line A—A.

The apparatus according to FIGS. 2 and 3 is of similar design as the apparatus according to FIG. 1. However, with the apparatus of FIG. 2 a suction roller 25 is provided for removing the material from the tenter chains and for passing it on to the subsequent sieve drum 9. This suction roller 25 is provided, as shown in FIG. 3, with a separate radial fan 26 for the production of a suction draft, and the fan is arranged in a fan casing 27. The air drawn out of the suction roller 25 is blown into the workshop. For steaming processes a steam spray pipe 28 can be correlated to the suction roller 25. Further steam spray pipes (not shown) may be correlated to the tenter zone 4.

A partition means 29 which extends over the treatment chamber 14 as well as over the fan chamber 13 subdivides the apparatus into a drying and setting compartment 30 at the inlet end of the apparatus and into a cooling and conditioning compartment 31 at the discharge end of the apparatus. By means of another partition 32, shown by the dashed line, the common drying and setting compartment 30 may be subdivided into a separate drying chamber and into a setting chamber.

Figure 4:
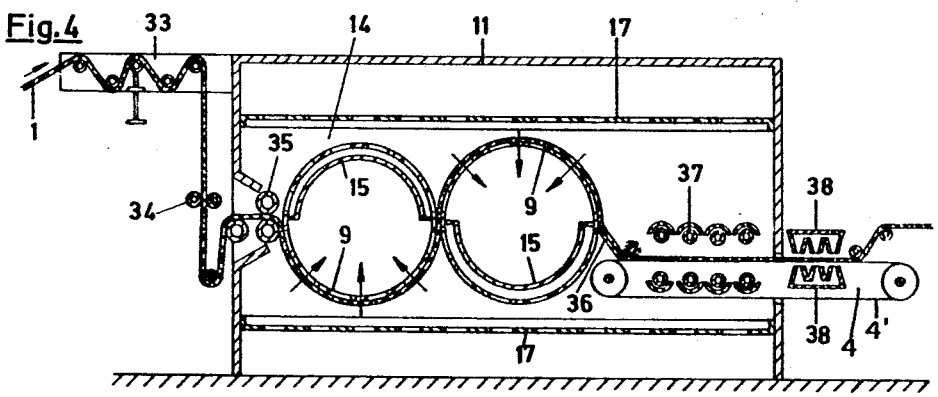
FIG. 4 is an apparatus according to the present invention wherein the tensioning elements are connected behind said apparatus.

In the embodiment according to FIG. 4 the tenter zone 4 containing tensioning means 4' is installed behind the sieve drum 9. The tenter zone is partially situated in the housing 11 so that the material has the same temperature as that on the sieve drums while being pinned up. In this apparatus, the material 1 is fed via an inlet creel 33 to a cloth guide 34 and passed on to a sieve drum 9 via a pair of rollers 35. The material can be passed on to the sieve drum with any desired overfeed by setting the speed of the pair of rollers 35 higher than that of the sieve drum. The material is then free to shrink on the sieve drum. The passage of the material 1 to the tenter zone 4 is effected by means of a chute 36. However, instead of the chute a roller may be provided. It is also possible to pin up the material with an overfeed. If a width stretching of for example 10 cm. or more is required, the length of material may be heated beyond the preceding treatment temperature by means of infrared radiators 37 or by means of hot air which flows out of jet boxes (not shown) and may be stretched in width in this condition. Outside of the housing 11, jet boxes 38 are provided for cooling down the material 1.

Figure 5:
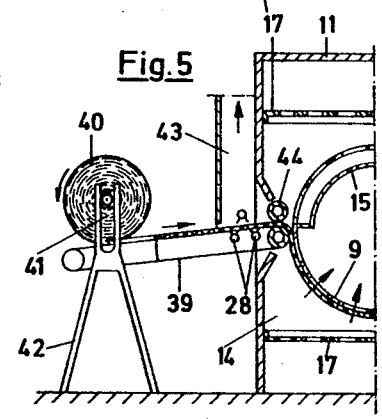
FIG. 5 is a different embodiment of the inlet of the apparatus shown in FIG. 4.

In the apparatus according to FIG. 5, a steam-permeable conveyor belt 39 is provided at the inlet of the apparatus. The material 1 is presented in the form of a package 40. The package 40 rests on the conveyor belt 39 and is guided in lateral slits 41 of a support 42. Steam spray pipes 28 are arranged above and beneath the sieve belt for steaming the material. Excessive steam may be exhausted through a duct 43. At the inlet, instead of a pair of rollers, a roller 44 which loosely rests on the conveyor belt is correlated to the conveyor belt 39.

Figure 6:
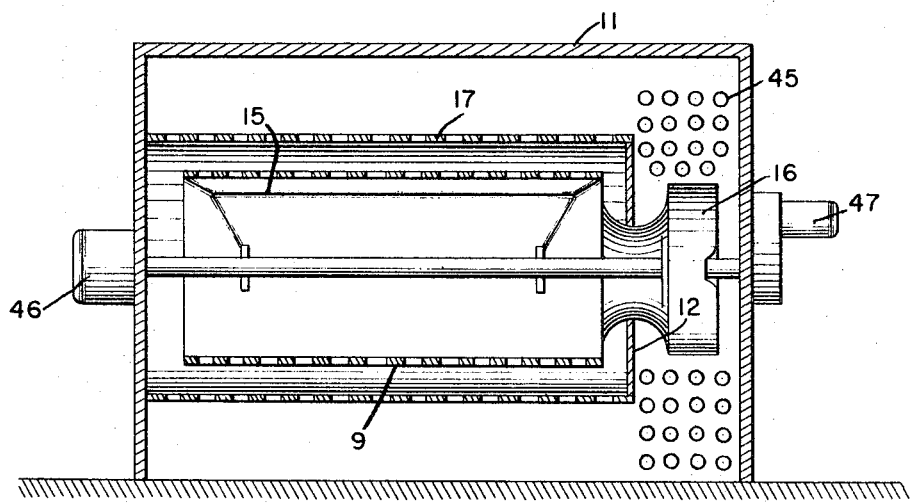
FIG. 6 shows the well known sieve drum means disposed in a treatment chamber.
Figure 7:
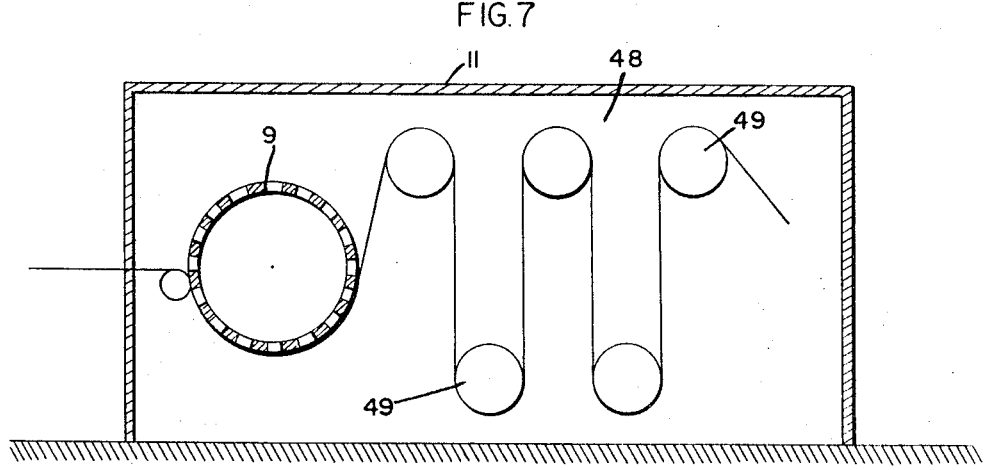
FIG. 7 shows the use of dwell zone in the apparatus of the present invention.

FIG. 6 shows the well known sieve drum means disposed in a treatment chamber and provided with heating means 45. The sieve drum means 9 is provided with a drum drive means 46 and the fan means 16 is provided with a fan drive means 47. FIG. 7 diagrammatically illustrates the use of a dwell zone 48 comprising rollers 49 in combination with at least one sieve drum means. The inlet means and the outlet tensioning means are not shown in the drawing.

Since modifications of this invention will be apparent to those skilled in the art, it is not desired to limit the invention to the exact constitution shown and described. Accordingly, all suitable modifications and equivalents may be resorted to which fall within the scope of the appended claims.

I claim:
1. A process for the treatment of material which comprises conveying a continuous length of material through a treatment chamber on the surface of at least one sieve means subjected to a suction draft, said material being held to said sieve means by said suction draft, and drawing a treatment medium around and through the material being treated, said material being held and guided at the outlet area of the apparatus in a stretched condition after it is removed from said sieve means on tensioning means disposed partially inside and partially outside the treatment chamber.

2. The process of claim 1, wherein at the outlet of the apparatus the material being treated is conveyed onto tensioning elements while substantially at the treatment temperature.

3. The process of claim 1, wherein the material is passed in a spread condition to a conveying means, jetted with steam on both sides of said material, dried and/or heat-set on at least one sieve means subjected to a suction draft and then held, cooled and conditioned between tender chains of the tensioning elements.

4. An apparatus for the treatment of materials which comprises a substantially closed treatment chamber, at least one sieve conveying means subjected to a suction draft disposed within said chamber, fan means for producing a suction draft in said chamber and for circulating the treatment medium, heating means provided in the circulation zone of the treatment medium and tensioning means at least partially disposed outside and partially disposed inside the treatment chamber as a discharge means.

5. The apparatus of claim 4, wherein the tensioning means communicates with the last conveying sieve means in said chamber, the material being treated being transferred from the conveying means to the tensioning means at substantially the treatment temperature.

6. The apparatus of claim 5, wherein the tensioning means is heated by the treatment medium in the treatment chamber.

7. The apparatus of claim 6, wherein additional heating means cooperate with the tensioning means to additionally heat the material being conveyed on said tensioning means.

8. The apparatus of claim 6, wherein cooling and conditioning means are associated with the tensioning means for cooling down the material being treated before it is removed from said tensioning means.

9. The apparatus of claim 4, wherein a steam-permeable inlet conveying means is provided outside the treatment chamber as the inlet means, said conveying means having steam producing means associated therewith.

10. The apparatus of claim 9, wherein the conveying means is a sieve belt and the steam producing means are steam nozzle tubes.

11. The apparatus of claim 9, wherein a material package is associated with the inlet conveying means and is guided in lateral, stationary support means which contain guide slits which are open at the top.

12. The apparatus of claim 5, wherein in the treatment chamber jet boxes are associated with the tensioning means, said jet boxes blowing a gaseous or vaporous treatment medium against the material being treated.

13. The apparatus of claim 4, wherein the treatment chamber is provided with at least one sieve means at the inlet, a dwell zone, and a tenter zone at the discharge end of said chamber.

14. The apparatus of claim 13, wherein the dwell zone comprises two rows of rollers over which the material being treated is alternately guided.

15. The apparatus of claim 13, wherein the sieve conveying means are sieve drum means subjected to a suction draft.

References Cited
UNITED STATES PATENTS

| 3,021,607 | 2/1962 | Fleissner | 34—115 |
| 3,413,731 | 12/1968 | Fleissner | 34—115 |
| 3,503,134 | 3/1970 | Fleissner | 34—12 |

FREDERICK L. MATTESON, Primary Examiner

R. A. DUA, Assistant Examiner

U.S. Cl. X.R.

34—115, 158; 26—60